Patented Aug. 29, 1944

2,356,879

UNITED STATES PATENT OFFICE 2,356,879

PROCESS OF PREPARING LUSTROUS COATINGS

Walter Pense and Werner Asch, Frankfort-on-the-Main, Philipp May, Ludwigshafen-on-the-Rhine, and Hermann Stärk, Bad Soden in Taunus, Germany; vested in the Alien Property Custodian No Drawing. Application November 26, 1940, Serial No. 367,262. In Germany December 12, 1939

2 Claims. (Cl. 117—142)

The present invention relates to a process of preparing lustrous coatings and the materials thus produced and it especially relates to lustrous coatings on materials of fibrous structure selected from the group consisting of leather, artificial leather, oilcloth, vulcanized fiber and paper board.

Various processes are already known for producing coatings on leather and other fibrous materials with synthetic resins, for instance resins obtained by polymerization processes. It is, however, in general not possible to produce lustrous coatings by glazing since the products used are thermoplastic and soften during the glazing operation.

Now we have found that lustrous coatings may be produced on fibrous materials, such as leather, artificial leather, oilcloth, paper board or vulcanized fiber by applying to said materials a solution of a salt of the interpolymerizate from unsaturated carboxylic acids and vinyl compounds and subsequently glazing the impregnated materials. According to the present invention there are, for instance suitable for the process herein described the water-soluble alkali metal salts, ammonium salts and amino salts of interpolymerizates from crotonic acid, acrylic acid, alphamethacrylic acid, tetrahydrophthalic acid, maleic acid and vinyl ester, such as vinyl acetate, vinyl propionate, or vinyl ethers such as vinyl methyl ether, vinyl butyl ether, or other vinyl compound, such as styrene.

The solutions of salts of the interpolymerization products have a neutral reaction and are resistant to alkali. By a suitable selection of the components and the polymerization process there may be prepared interpolymerizates of a different viscosity. The resistance to water and fastness to rubbing of the coatings produced with the resins named herein may be improved by after-treating the materials with formaldehyde or mixtures of formaldehyde and metal salts, such as salts of chromic acid or aluminium salts. The coating material may be applied in several layers. Furthermore it is possible to apply the coating destined for producing the lustre on other coatings, for instance coatings consisting of albuminous substances, such as albumin and casein. Pigments may likewise be admixed to the coating materials, but in the top coating the addition of pigments is suitably avoided.

The solutions of salts of the interpolymerizates from unsaturated carboxylic acids and vinyl compounds may be used alone or in combination with other binding and finishing agents; there may, for instance be named water-soluble or alkali-soluble albuminous substances, water-soluble cellulose compounds, natural or artificial resins.

The softness and suppleness of the coatings may be varied by the addition of water-soluble softening agents, such as glycerine, poly-glycerine, or of emulsions of fats, oils and waxes. Owing to the dispersing action of the interpolymerizates it is possible to add waxes, natural resins, fats and oils to the finishing material, this having not always been possible when the albuminous substances were used.

The following examples serve to illustrate the invention, but they are not intended to limit it thereto:

1. A lustre may be produced on leather by operating for instance as follows: A water-soluble coating-color to be applied on leather is first prepared in the following manner:

| | Grams |
|---|---|
| A solution of 6 per cent strength of the sodium salt of the free acid from the interpolymerization product prepared from styrene and maleic anhydride | 80 |
| A solution of 20 per cent strength of the ammonium salt of the free acid from the interpolymerization product obtained from vinyl butyl ether and maleic anhydride | 25 |
| Iron oxide | 70 |
| Glycerin | 10 |
| Neat's-foot oil | 2 |
| Dyestuff No. 293 (Schultz, Farbstofftabellen 7th edition, 1931) | 5 |

The mixture is ground with addition of water to form a uniform paste and before use it is diluted with water to 1500 grams. The coating-color thus obtained is applied by means of a brush or a spraying device to chrome-tanned calf which is prepared in known manner for finishing. If required several coatings may be applied with the same mixture until the leather is sufficiently covered; before each application of the mixture the leather is allowed to dry. For producing a lustre the following dressing is then applied to the leather:

| | Grams |
|---|---|
| A solution of 20 per cent strength of the ammonium salt of the free acid from the interpolymerization product prepared from vinyl butyl ether and maleic anhydride | 50 |
| A solution of 6 per cent strength of the sodium salt of the free acid from the interpolymerization product obtained from styrene and maleic anhydride | 16 |
| Glycerine | 16 |
| Water | 774 |

After the dressing applied has been allowed to dry the following solution is applied to the material with a spraying device in order to improve the fastness to water:

| | Grams |
|---|---|
| Chromic chloride (crystallized) | 5 |
| Formaldehyde of 30 per cent strength | 200 |
| Water | 795 |

The leather is then well dried, glazed and ironed.

The leather thus finished is of a very uniform color, has a good lustre and is suitable as boot uppers.

The following kinds of leather may be dressed with the coating-color above described:

Box-calf, box-sides, glazed kid, colt kid, chevrette, water-proof, garment-leather, glove leather such as chamois leather, mocha, alum velour, nappa leather, velvet and nubuck leather; furthermore all vegetable leathers such as sole leather, harness leather, vachettes and all kinds of fancy leathers and leathers used for hand bags and consisting of animal and reptile leathers, such as fish-, snake-, lizard- or frog skins and the like. These leathers may be finished either on the grain side, it being immaterial whether the grain is present or has been removed, or on the flesh side. It is also possible to coat with the coating-color finished articles made of dyed or non-dyed leathers such as boots, handbags, portefolios, bags or the like; the appearance of these articles may be improved by such a treatment.

2. A lustrous coating for artificial leather prepared from comminuted leather and synthetic resins is prepared as follows:

| | Grams |
|---|---|
| A solution of 25 per cent strength of the ethyl amine salt of the free acid from the interpolymerization product obtained from vinyl methyl ether and maleic anhydride | 100 |
| Dyestuff No. 1236 (Schultz, Farbstofftabellen, 7th edition, 1931) | 10 |
| Glycerine | 10 |
| Neat's-foot oil | 2 | are ground, while adding water, until a uniform paste is produced; 25 grams of an emulsion of 40 per cent strength of polyacrylic acid ethyl ester in water are then added and the whole is made up with water to 750 grams.

The mixture is applied in the same manner as it is described in Example 1.

The following mixture is used as lustrous finish:

75 grams of a solution of 25 per cent strength of the ammonium salt of the free acid from the interpolymerization product obtained from vinyl-methyl-ether and maleic anhydride 8 grams of glycerine, diluted with water to 1000 grams For improving the fastness to water the leather is finally hardened with the following solution:

| | Grams |
|---|---|
| Aluminium sulfate | 10 |
| Formaldehyde of 30 per cent strength | 200 |
| Water | 790 |

The artificial leather thus treated is finally glazed.

3. A coating consisting of casein, pigments and Turkey red oil is applied in the usual manner on vulcanized fiber. For producing a gloss and improving the fastness to rubbing the vulcanized fiber is sprayed with the following finishing:

| | Grams |
|---|---|
| A solution of 10 per cent strength of the ammonium salt of the free acid from the interpolymerization product prepared from vinyl acetate and maleic anhydride | 200 |
| Polyglycerin | 8 |
| Water | 792 |

After the finishing has been applied the material is hardened with a formaldehyde solution of 10 per cent strength, dried and ironed or calendered. The material thus treated shows a high gloss.

4. A lustrous coating on paper board is produced as follows: A color-coating for paper board is first composed in the following manner: There are fused 3 grams of colophony and the melt obtained is stirred into 50 grams of a solution of 10 per cent strength of the ammonium salt of the free acid from the interpolymerization product obtained from vinyl acetate and crotonic acid.

50 grams of methyl cellulose solution of 5 per cent strength, 10 grams of the dyestuff No. 86 (Schultz Farbstofftabellen, 7th edition, 1931) and 10 grams of glycerine are added to the mixture and the whole is ground with the addition of water until a uniform paste is obtained. The mixture is adjusted to 500 grams by adding water and applied to the paper board with a dyeing machine or a spraying device. In order to produce a thick coating the mixture is applied several times and between each application the material must be dried.

As a glazing finish one or several coatings of the following composition are applied to the material:

5 grams of colophony are fused and the melt obtained is stirred into 100 grams of a solution of 10 per cent strength of the ammonium salt of the free acid from the interpolymerization product prepared from vinyl acetate and crotonic acid and the whole is then diluted with water to 500 grams The finish is after-treated as described in Example 1 with chromic chloride and formaldehyde for improving the fastness to water. After drying the paper board is calendered and a high gloss is produced thereon.

5. A finish for leather is prepared as follows: 25 grams of a solution of 10 per cent strength of the ammonium salt of the free acid from the interpolymerizate from vinyl acetate and acrylic acid are diluted with water to 1 liter. The finish is applied to chrome-tanned goat-skin by means of a soft brush or a spraying device; the goat skin has previously been dyed, fat-liquored, dried, and staked in known manner.

After drying the finish may very readily be glazed and a satisfactory finishing effect of a high gloss is obtained.

We claim:

1. The process of producing lustrous coatings on materials of fibrous structure selected from the group consisting of leather, artificial leather, oilcloth, vulcanized fiber, paper board which comprises applying to the said materials a solution of a salt of the free acid from the interpolymerizate from maleic anhydride and vinyl butyl ether and subsequently glazing the impregnated materials.

2. The process as defined in claim 1, in which the impregnated materials of fibrous structure are after-treated with an aqueous formaldehyde-chromic chloride solution and dried prior to the glazing thereof.

WALTER PENSE.
WERNER ASCH.
PHILIPP MAY.
HERMANN STÄRK.